(12) United States Patent
Natsume

(10) Patent No.: US 7,511,758 B2
(45) Date of Patent: Mar. 31, 2009

(54) OPTICAL APPARATUS AND CAMERA SYSTEM

(75) Inventor: Satoshi Natsume, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

(21) Appl. No.: 10/996,215

(22) Filed: Nov. 22, 2004

(65) Prior Publication Data

US 2005/0110891 A1 May 26, 2005

(30) Foreign Application Priority Data

Nov. 25, 2003 (JP) ............................. 2003-394189

(51) Int. Cl.
*H04N 5/232* (2006.01)
*H04N 5/262* (2006.01)
*G03B 17/00* (2006.01)

(52) U.S. Cl. ..................... 348/345; 348/240.99; 396/79

(58) Field of Classification Search ................. 348/347, 348/240.99, 240.3, 240.1, 357; 396/72, 86, 396/76, 103, 79
See application file for complete search history.

(56) References Cited

U.S. PATENT DOCUMENTS

| 4,969,044 | A | * | 11/1990 | Hijikata et al. | .............. 348/347 |
| 5,434,621 | A | * | 7/1995 | Yu | .............................. 348/347 |
| 5,543,840 | A | * | 8/1996 | Hirota | ......................... 348/345 |
| 6,654,053 | B1 | * | 11/2003 | Hwang | ..................... 348/240.1 |
| 6,661,585 | B2 | * | 12/2003 | Okawara | ..................... 359/697 |
| 2003/0030735 | A1 | * | 2/2003 | Ike | ......................... 348/240.3 |

FOREIGN PATENT DOCUMENTS

| EP | 1096286 A | 5/2001 |
| JP | 2001-124979 A | 5/2001 |

* cited by examiner

*Primary Examiner*—David L Ometz
*Assistant Examiner*—Luong T Nguyen
(74) *Attorney, Agent, or Firm*—Lock Lord Bissell & Lidell LLP

(57) ABSTRACT

There are provided an optical apparatus and a camera system in which preset image-taking is possible without performing focusing adjustment for objects, even during image-taking of the objects at different distances by using a preset function. In the optical apparatus comprising a storage section which stores preset information, a preset control section which performs preset operation by using the preset information, a focusing control section which controls focusing operation, and a controller which controls the preset operation by preset control section and the focusing operation by the focus control section.

4 Claims, 8 Drawing Sheets

PRIOR ART

OPTICAL APPARATUS AND CAMERA SYSTEM

BACKGROUND OF THE INVENTION

1. Field of the Invention

The present invention relates to an optical apparatus (lens apparatus) and a camera system used in television cameras or video cameras or the like, and more particularly, to an optical apparatus and a camera system having a zoom lens system etc. which are used in an ENC camera etc.

2. Description of the Related Art

As image-taking apparatuses using a television camera or a video camera, products which can provide various image-taking methods for storing arbitrarily zoom positions or speeds in memory and also for reproducing them have been sold and used by user. In order to realize such image-taking methods easily and precisely, and to further make them compact, there have been disclosed Japanese Patent Application Laid-Open No. 2001-124979 and EP A2 1096286.

Among these various image-taking methods, typical examples of image-taking methods are as follows.

First, there is an image-taking method in which a zoom lens unit is moved with a predetermined, constant speed corresponse to a predetermined zoom magnification for image-taking. And, in contrast to this method, there is proposed an image-taking method having the following function. That is, an arbitrary zoom position is stored in memory in advance as a preset position and an arbitrary zoom lens drive speed is stored in memory in advance as a preset speed. When a switch is turned on during image-taking, a zoom lens unit is moved to the preset position with the preset speed. In the specification, this preset function is referred to as "position preset zoom control".

Second, there is an image-taking method in which a zoom lens unit is moved in a predetermined zoom direction with a predetermined speed for image-taking. And, in contrast to this method, there is proposed an image-taking method having the following function. That is, an arbitrary zoom lens drive direction is stored in memory in advance as a preset direction, an arbitrary zoom lens drive speed is stored in memory in advance as a preset speed, and when a switch is turned on during image-taking, the zoom lens unit is moved in the preset direction with the preset speed. In the specification, this preset function is referred to as "speed preset zoom control".

In the above-mentioned "position preset zoom control" and "speed preset zoom control", a preset position, a preset speed, and a preset direction must be stored in a storage section. Below, a storing method and an operation method of the preset position, speed, and direction will be explained in reference to FIG. 6.

In FIG. 6, reference numeral 1 denotes a zoom control switch which is controlled by user, reference numeral 2 denotes an instruction signal generating section which generates an instruction signal to instruct a drive direction and a drive speed (which may be replaced by a drive amount and a drive position) proportional to an operation amount of the zoom control switch 1 in order to electrically drive a zoom lens optical system 7 which will be described below.

Reference numeral 3 denotes a zoom speed variable volume which varies the drive speed of the below-described zoom lens optical system 7 in response to the operation amount of the zoom control switch 1, reference numeral 4 denotes an instruction signal calculation section which performs signal level and shift conversion for inputting the instruction signal into a below-mentioned A/D converter 5, and reference numeral 5 denotes the A/D converter which converts an analog signal outputted from the instruction signal calculation section 4 to a digital signal.

Reference numeral 6 denotes a CPU which is responsible for the drive of a preset function, reference character 6a denotes a storage section (memory), installed in the CPU 6, which can store the preset position, the preset speed, etc., and reference numeral 7 denotes a zoom lens optical system which performs zooming of a lens apparatus.

Reference numeral 8 denotes a D/A converter which converts a digital signal from the CPU 6 as the instruction signal outputted for driving the zoom lens optical system 7 to an analog signal, and reference numeral 9 denotes the instruction signal calculation section which performs signal level and shift conversion of the instruction signal outputted from the D/A converter 8.

Reference numeral 10 denotes an instruction signal switching section which switches the drive of the zoom lens optical system 7 from the zoom control switch 1, or from the CPU 6, reference numeral 11 denotes an electric power amplifier which drives a below-mentioned motor 12, reference numeral 12 denotes the motor which drives the zoom lens optical system 7, and reference numeral 13 denotes a speed signal detection section which outputs a speed signal in accordance with a drive speed of the zoom lens optical system 7.

Reference numeral 14 denotes a speed signal calculation section which performs signal level and shift conversion for inputting the speed signal into a below-mentioned A/D converter 15, and reference numeral 15 denotes an A/D converter which converts an analog signal outputted from the speed signal calculation section 14 to a digital signal.

Reference numeral 16 denotes a position signal detection section which outputs a position signal corresponding to a position of the zoom lens optical system 7, and reference numeral 17 denotes a position signal calculation section which performs signal level and shift conversion for inputting a position signal into a below-mentioned A/D converter 18.

Reference numeral 18 denotes an A/D converter which converts an analog signal outputted from the position signal calculation section 17 to a digital signal, and reference numeral 20 denotes a position preset zoom switch which instructs the start or end of the preset drive of position preset zoom.

Reference numeral 22 denotes a speed preset zoom switch which instructs the start or end of the preset drive of speed preset zoom, and reference numeral 24 denotes a memory switch which instructs the memory information regarding the preset position, preset speed and preset direction of the various functions mentioned above. In a lens apparatus or a lens drive unit having the above-mentioned structure, as preparatory work for storing a preset position in memory, it is necessary to motor-driving the zoom lens optical system 7 up to the preset position, or to motor-driving the zoom lens optical system 7 in advance for storing the preset speed in memory.

Here, at first, drive control from the zoom control switch 1 to the zoom lens optical system 7 will be explained. Once the zoom control switch 1 is operated, an instruction signal which instructs the drive direction and drive speed (which may be replaced by a drive amount or drive position) proportional to its drive amount is outputted from the instruction signal generating section 2. This instruction signal is inputted into the electric power amplifier 11 via the zoom speed variable volume 3, which varies drive speed of the zoom lens optical system 7 in response to the drive amount of the zoom control switch 1, and via the A side of the instruction signal switching section 10, and, after amplified to a predetermined level by the electric power amplifier 11, it is inputted into the motor 12. After the above procedure, the motor 12 starts operation and the zoom lens optical system 7 is in operation.

Next, the memory setting procedure of the preset position, preset speed, and preset direction will be explained.

At first, the memory setting procedure of the preset position will be explained. When the preset position is stored in memory, the position required for the zoom lens optical system 7 can be detected by inputting the output from the position signal detection section 16 into the CPU 6 via the position signal calculation section 17 and the A/D converter 18.

In this memory setting procedure, an image-taker moves in advance the zoom lens optical system 7 to a desired preset position. Then, while the memory switch is on, the position of the zoom lens optical system 7 (the actual position detected via the position signal detection section 16) at the time when the position preset zoom switch 20 is switched from OFF to ON is stored in the CPU 6 as a preset position.

Next, the memory setting procedure of the preset speed will be explained.

When the preset speed is stored in memory, the actual drive speed required for the zoom lens optical system 7 can be detected by inputting the output from the speed detection section 13 into the CPU 6 via the speed signal calculation section 14 and the A/D converter 15.

Furthermore, whether the zoom control switch 1 is operated or not, which is required for storing the preset speed, is evaluated by confirming the following sequence. That is, an instruction signal proportional to the operation amount of the zoom control switch 1 is outputted from the instruction signal generating section 2, and inputted into the CPU 6 via the zoom speed variable volume 3, the instruction signal calculation section 4, and the A/D converter 5.

In this memory setting procedure, the user operates the zoom control switch 1. While the zoom lens optical system 7 is in operation with a preset speed prepared in advance, the drive speed of the zoom lens optical system 7 (the actual drive speed of the zoom lens optical system 7 detected via the speed signal detection section 13) at the time when the memory switch 24 is switched from OFF to ON is stored in the CPU 6 as a preset speed.

Next, the memory setting procedure of the preset speed and preset direction will be explained.

In this memory setting procedure, the user operates the zoom control switch 1. While the zoom lens optical system 7 is in operation with a preset speed prepared in advance and in a preset direction prepared in advance, the drive speed and direction of the zoom lens optical system 7 (actual drive speed and actual drive direction of the zoom lens optical system 7 detected via the A/D converter 15) at the time when the memory switch is switched from OFF to ON are stored in the CPU 6 as a preset speed and a preset direction.

Next, the operation method of each preset drive will be explained.

At first, the operation method of "position preset zoom control" will be explained.

For an actual use of the preset function, the preset drive will be explained.

When the position preset zoom switch 20 is turned on, the present position of the zoom lens optical system 7 is detected by inputting the output from the position signal detection section 16 into the CPU 6 via the position signal calculation section 17 and the A/D converter 18 and compared with a stored preset position. When this position is not consistent, in order to move the position of the zoom optical system 7 up to the stored preset position, the instruction signal from the CPU 6, which is calculated so as to drive with the preset speed, is inputted into the electric power amplifier 11 via the D/A converter 8, the instruction signal calculation section 9, and the A side of the instruction signal switching section 10, and after amplified to a predetermined level by the electric power amplifier 11, it is inputted into the motor 12. After this, the motor 12 starts driving, and the zoom lens optical system 7 also starts driving. And, when the position of the zoom lens optical system 7 coincides with the preset position, the drive stops.

Next, the operation method of "speed preset zoom control" will be explained.

When the speed preset zoom switch 22 is turned on, in order to drive the zoom lens optical system 7 in the stored preset direction with the stored speed, an instruction signal calculated by the CPU 6 is inputted into the electric power amplifier 11 via the D/A converter 8, the instruction signal calculation section 9, and the A side the instruction signal switching section 10, and then inputted into the motor 12 after amplified to a predetermined level by the electric power amplifier 11. As a result, the motor starts driving, and then the zoom lens optical system 7 also starts driving. And, the position of the zoom lens optical system 7 is moved up to the edge of drive direction, and then the drive stops.

However, in optical apparatuses having the above-mentioned preset function of the prior art, due to the preset function which uses a stored zoom lens position, the user himself or herself must perform focusing adjustment for an object at a preset position. For this reason, when the user performs image-taking of objects at different distances by using the preset function, it is necessary to perform focusing adjustment for each object at each preset position. Therefore, since focusing adjustment is necessary for different objects, there is a problem in that troublesome operations must be performed.

Accordingly, an object of the present invention is to solve the above-mentioned problems and to provide an optical apparatus and a camera system which allow the preset image-taking without requiring focusing adjustment for objects at different distances even when a preset function is used for image-taking.

SUMMARY OF THE INVENTION

According to the present invention, there are provided an optical apparatus and a camera system having the following structure. That is, the optical apparatus according to the present invention comprises a storage section which stores preset information, a preset control section which performs preset operation by using the preset information, a focusing control section which controls focusing operation, and a controller which controls the preset operation by preset control section and the focusing operation by the focus control section.

Specific structures of embodiments according to the present invention will be explained by using the embodiments shown below.

DETAILED DESCRIPTION OF THE PREFERRED EMBODIMENT

Embodiment 1

According to Embodiment 1 of the present invention, a combined structure of preset operation and auto focus (AF) according to the present invention described above is used to perform auto focus during "position preset zoom control".

Figure 1:
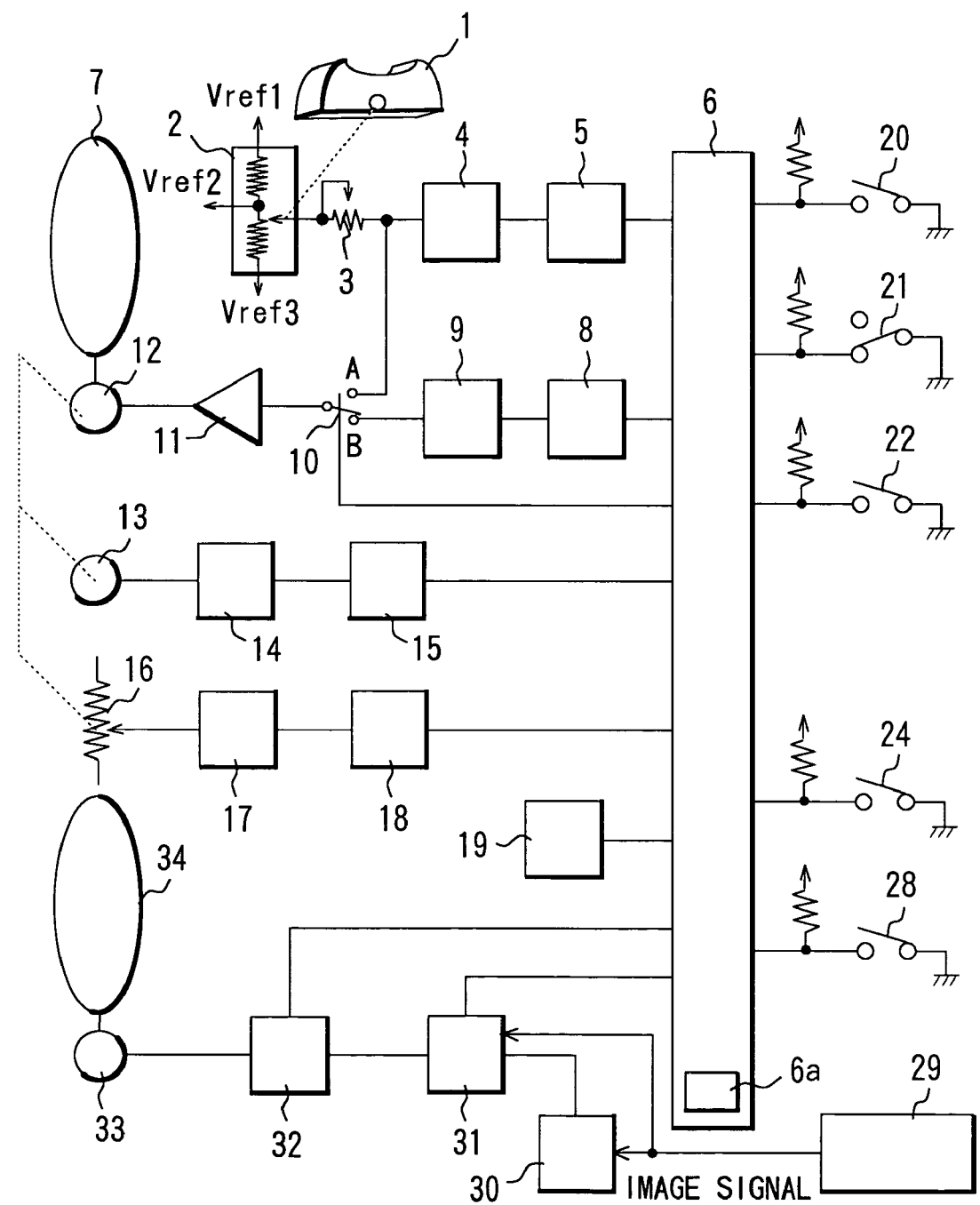
FIG. 1 shows a block diagram of a lens apparatus according to embodiments of the present invention.
Figure 2A:
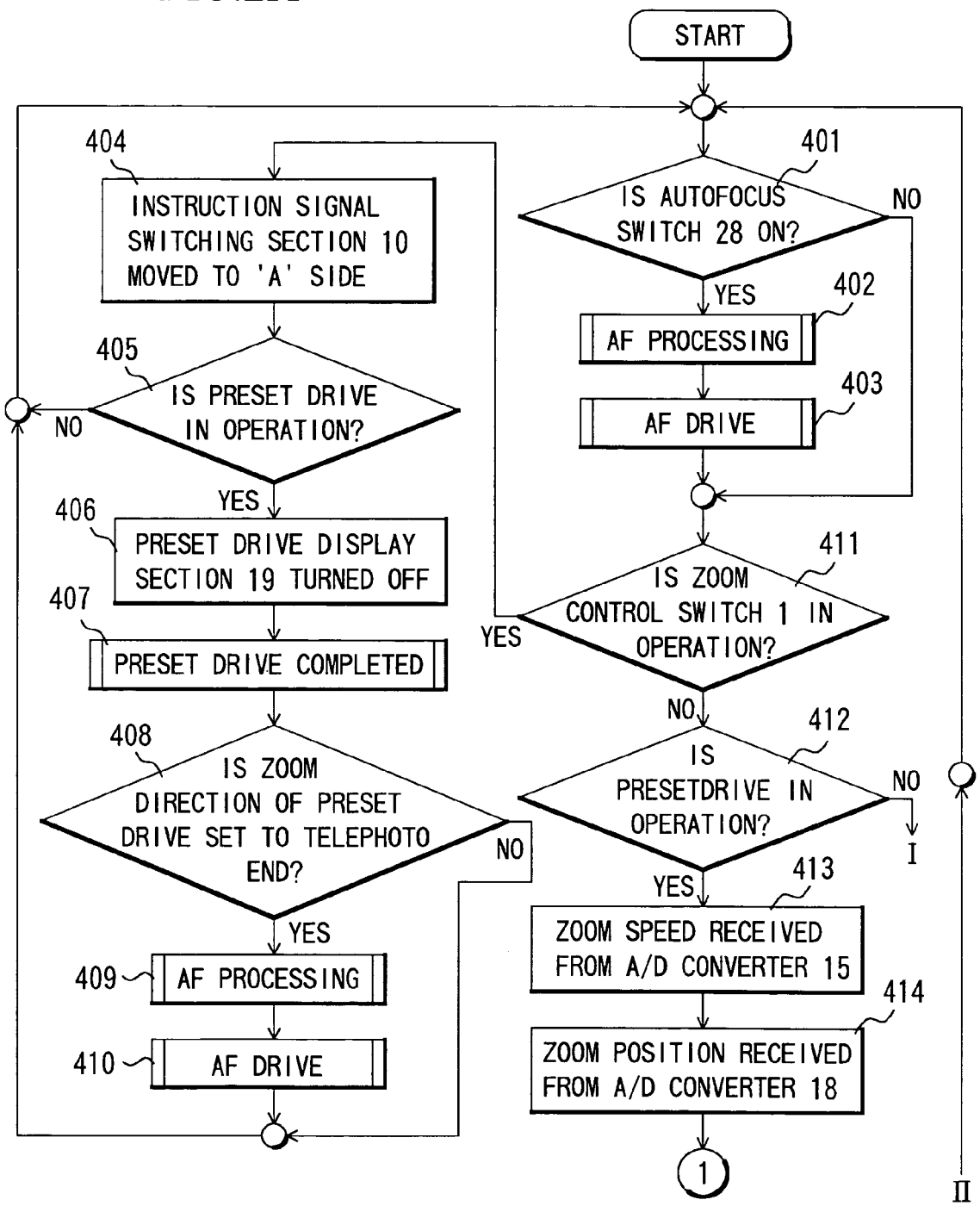
FIGS. 2A and 2B show flow chart explaining the process in CPU of a position preset zoom system according to Embodiment 1 of the present invention.
Figure 2B:
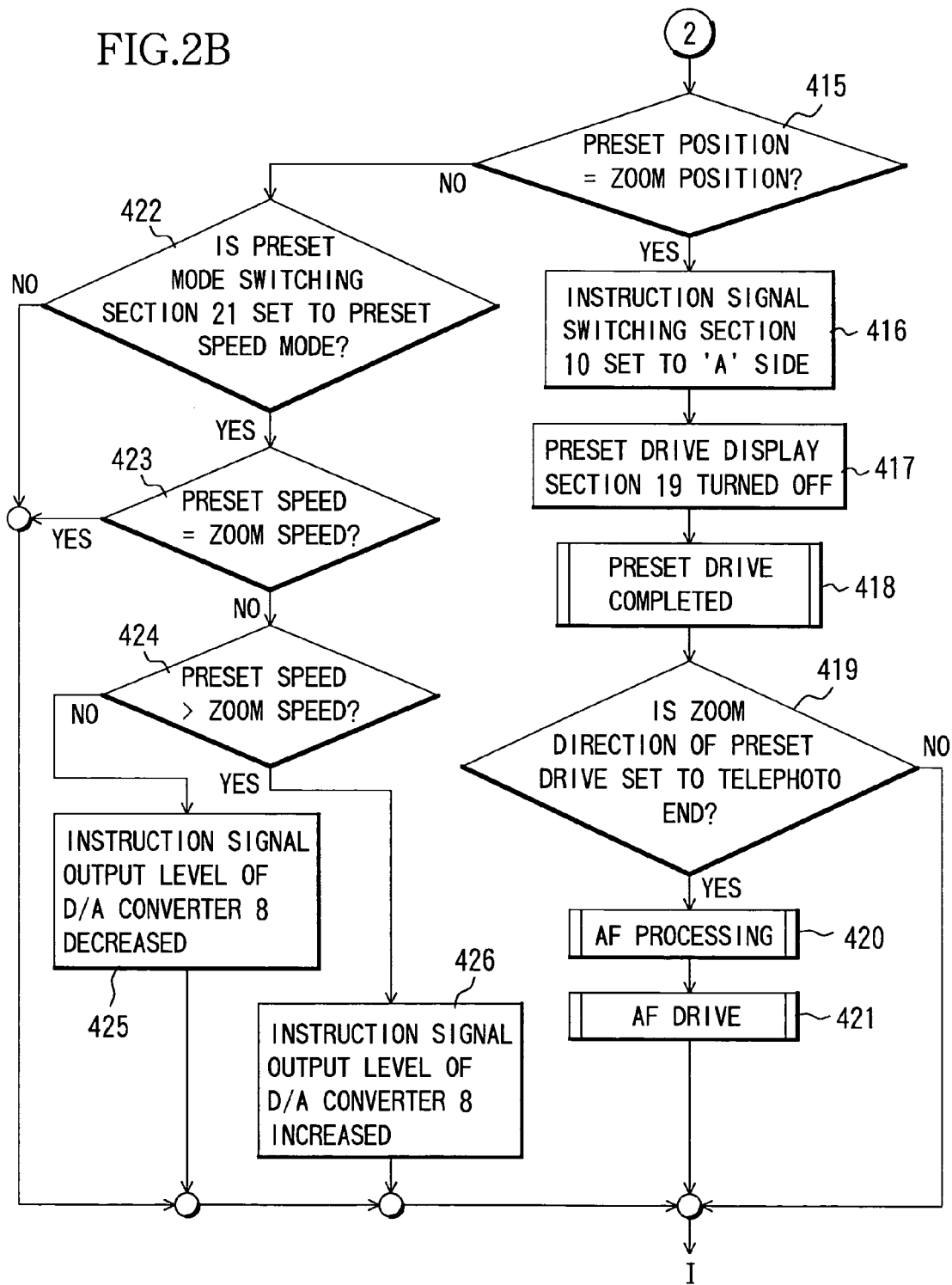
Figure 3:
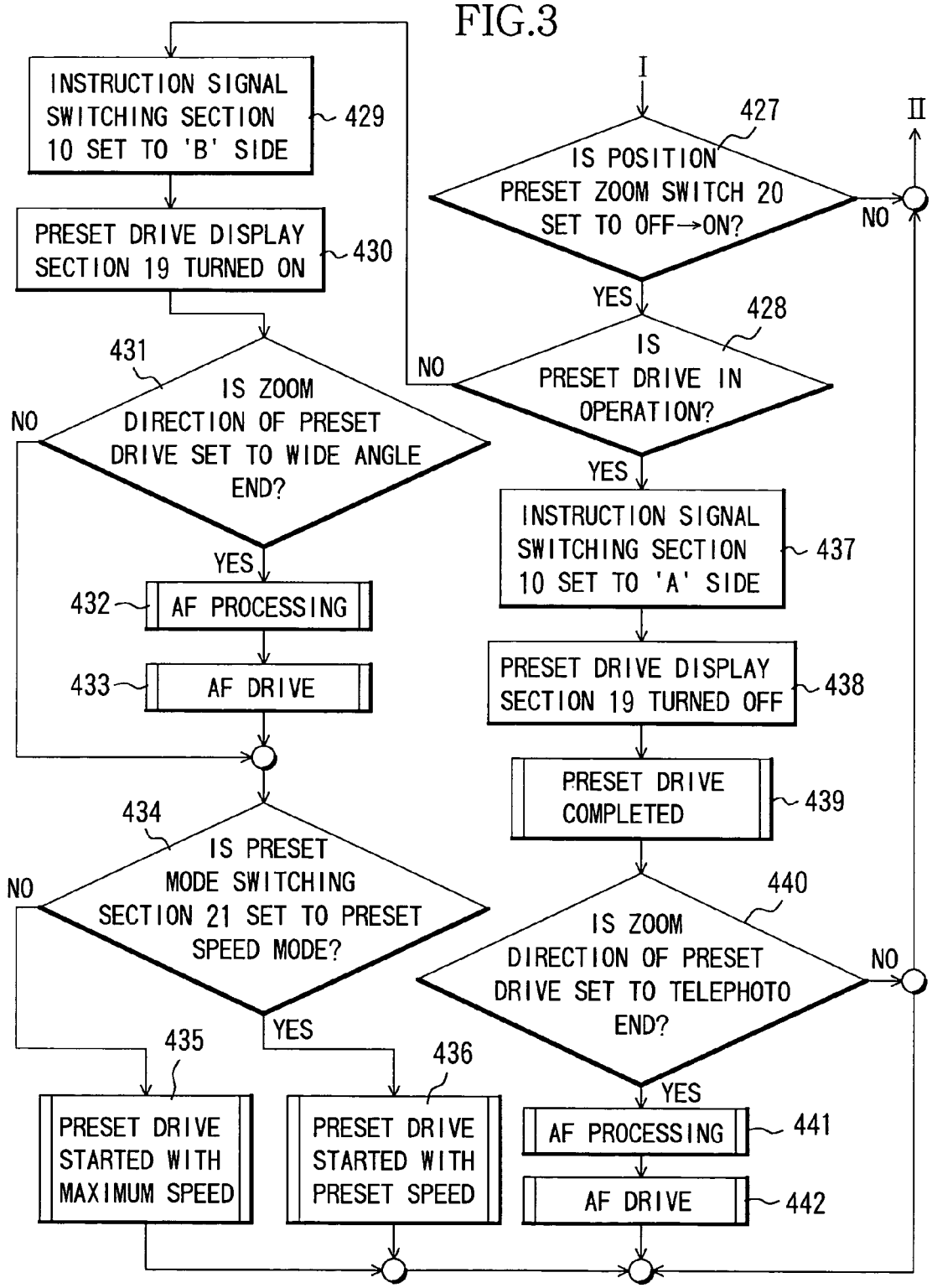
FIG. 3 shows a flow chart explaining the step following a mark I in the flow chart shown in FIG. 2 according to Embodiment 1 of the present invention and the step followed by a mark II.

FIG. 1 shows a block diagram of a lens apparatus (optical apparatus) according to the present embodiments.

In FIG. 1, reference numeral 1 denotes a zoom control switch which is controlled by the user, and reference numeral 2 denotes an instruction signal generating section which generates an instruction signal to instruct a drive direction and a drive speed (which may be replaced by a drive amount or a drive position) proportional to the drive amount of the zoom control switch 1.

Reference numeral 3 denotes a zoom speed variable volume which varies the drive speed of a below-mentioned zoom lens optical system 7 in response to the drive amount of the zoom control switch 1, reference numeral 4 denotes an instruction signal calculation section which performs signal level and shift conversion for inputting an instruction signal into a below-mentioned A/D conversion 5, and reference numeral 5 denotes the A/D converter which converts an analog signal outputted from the instruction signal calculation section 4 into a digital signal.

Reference numeral 6 denotes CPU which is responsible for preset function drive, reference character 6a, installed in the CPU 6, denotes a storage section which can store in memory a preset position, a preset speed, etc., and reference numeral 7 denotes a zoom lens optical system which performs zooming of the lens apparatus.

Reference numeral 8 denotes a D/A converter which converts a digital instruction signal outputted from the CPU 6 for driving the zoom lens optical system 7 into an analog signal, and reference numeral 9 denotes an instruction signal calculation section which performs signal level and shift conversion of the instruction signal outputted from the D/A converter 8.

Reference numeral 10 denotes an instruction signal switching section which switches the drive operation of the zoom lens optical system between the zoom control switch 1 and the CPU 6, reference numeral 11 denotes an electric power amplifier which drives a below-mentioned motor 12, reference numeral 12 denotes a motor which drives the zoom lens optical system 7, and reference numeral 13 denotes a speed signal detection section which outputs a speed signal in accordance with the drive speed of the zoom lens optical system 7.

Reference numeral 14 denotes a speed signal calculation section which performs signal level and shift conversion for inputting the velocity signal into a below-mentioned A/D converter 15, and reference numeral 15 denotes the A/D converter which converts an analog signal outputted from the speed signal calculation section 14 into a digital signal.

Reference numeral 16 denotes a position signal detection section which outputs a position signal in response to the position of the zoom optical system, and reference numeral 17 denotes a position signal calculation section which performs signal level and shift conversion for inputting the position signal into a below-mentioned A/D converter 18.

Reference numeral 18 denotes an A/D converter which converts an analog signal outputted from the position signal calculation section 17 into a digital signal, and reference numeral 19 denotes a preset drive display section which judges visually whether "position reset zoom drive" or "speed preset zoom drive" is in operation or not.

Reference numeral 20 denotes a position preset zoom switch which indicates the start or end of the preset drive of position preset zoom, and reference numeral 21 denotes a preset mode switching section which selects a drive speed of the zoom lens optical system 7 during preset driving from the preset speed or the maximum speed.

Reference numeral 22 denotes a speed preset zoom switch which indicates the start or end of the preset drive of speed preset zoom, and reference numeral 24 denotes a memory switch which indicates the memory information of a preset position, a preset speed, and a preset direction of the various functions mentioned above. Reference numeral 28 denotes an auto focus switch which indicates the start or end of the auto focus drive (focusing), and reference numeral 29 denotes a camera which outputs image information.

Reference numeral 30 denotes a synchronized signal detection section which generates a reference signal, wherein the reference signal is used to perform image signal processing by detecting a horizontal synchronized signal and a vertical synchronized signal from the image signal outputted from the camera. In addition, reference numeral 31 denotes an auto focus processing section which, by using the reference signal outputted from the synchronized signal detection section 30, generates a motor control signal for maximizing the sharpness evaluation value by extracting a sharpness evaluation value from the image signal outputted from the camera 29.

Reference numeral 32 denotes an auto focus control section which drives the motor 33 by using the motor control signal from the auto focus processing section 31, reference numeral 33 denotes a motor which drives a below-mentioned focus lens optical system 34, and 34 denotes the focus lens optical system which performs focusing adjustment.

Next, a drive which performs auto focus during "position preset zoom control" (hereinafter referred to simply as preset drive) according to the present embodiment will be explained.

Control during this preset drive is performed as follows. An instruction signal outputted from the CPU 6 is inputted into the motor 12 via the D/A converter 8, the instruction signal calculation section 9, the B side of the instruction signal switching section 10, and the electric power amplifier 11. Then, the zoom lens optical system 7 is driven up to the preset position set in advance with the maximum speed or with a preset speed set in advance. Then, AF processing is performed by the synchronized signal detection section 30 and the auto focus processing section 31, and after the control signal is inputted into the motor 33 via the auto focus control section 32, the focus lens optical system 34 is driven, and when the focus lens optical system 34 is an in-focus state, focusing operation is completed.

During preset driving, there are two cases where the zoom unit is moved toward TELE (telephoto end) and where the zoom unit is moved toward WIDE (wide angle end). When AF processing is performed, driving toward TELE rather than toward WIDE is likely to provide precise focusing adjustment. For this reason, the present embodiment will be explained by selecting the zoom drive direction during the preset drive, depending on whether the AF processing and AF drive are to be performed before or after the preset drive.

Processing of the CPU 6 during the preset drive is explained in reference to FIG. 1 and FIGS. 2A, 2B and 3 (flow charts).

First, in order to confirm whether an the user desires to use AF drive, determine whether the auto focus switch 28 is turned on (Step 401).

When the auto focus switch 28 is not ON, proceed to Step 411. When the auto focus switch 28 is ON, proceed to Step 402 and perform AF processing.

The AF processing, based on an image signal outputted from the camera 29 connected to the lens apparatus, generates a reference signal for image signal processing by detecting a horizontal synchronized signal and a vertical synchronized signal by the synchronized signal detection section 30. Further, the auto focus processing section 31, using the reference signal for image signal processing, generates a motor control signal so as to maximize the sharpness evaluation value by extracting a sharpness evaluation value from the image signal outputted from the camera 29. And, proceed to Step 403 and perform the AF drive.

The auto focus control section 32 drives the motor 33 by using the motor control signal from the auto focus processing section 31. As a result, the sharpness evaluation value becomes maximum. In other words, the focus lens optical system 34 is driven so as to be in-focus (focusing). When focusing adjustment is completed, the AF drive is finished. Then, proceed to Step 411. In Step 411, determine whether the zoom control switch 1 is in operation or not. When the zoom control switch 1 is in operation, in order to control the zoom lens optical system 7 by the zoom control switch 1, switch the instruction signal switching section 10 to the A side (Step 404).

Next, determine whether the preset drive is in operation or not (Step 405). When the preset drive is not in operation, again return to the step to determine whether the auto focus switch is ON (Step 401).

When the preset drive is in operation in Step 405, turn off the preset drive display section 19 (Step 406), and finish (stop) the preset drive (Step 407). Accordingly, in this case, it can be said that the preset drive is suspended partway. And, successively, determine whether the zoom direction of the preset drive is in the TELE direction or not (Step 408). When the zoom direction is in the TELE direction, perform the AF processing (Step 409). And, when focusing is achieved at the in-focus after AF driving, finish the AF drive (Step 410). An explanation on AF portion is omitted, as described before. And, return to the step to determine whether the auto focus switch is ON (Step 401). When the zoom direction is in the WIDE direction, also return to the step to determine whether the auto focus switch is ON (Step 401).

On the other hand, when the zoom control switch 1 is not in operation (Step 411), determine whether the preset drive is in operation (Step 412). When the preset drive is not in operation, then proceed to Step 427.

In Step 412, when the preset drive is determine to be in operation, obtain the speed of the zoom lens optical system 7 from the A/D converter 15 (Step 413), and further obtain the position of the zoom lens optical system 7 from the A/D converter 18 (Step 414).

Next, check whether the zoom position obtained in Step 414 and a preset position stored in the storage section 6a in advance are equal (Step 415). When the zoom position and the preset position are equal, switch the instruction signal switching section 10 to the A side (Step 416), turn off the preset drive display section 19 (Step 417), and finish the preset drive (Step 418). Next, determine whether the zoom direction of the preset drive is in the TELE direction (Step 419). When the zoom direction is in the TELE direction, perform the AF processing (Step 420). And, when focusing is achieved at the in-focus after AF driving, finish the AF drive (Step 421). An explanation on the drive of AF portion is omitted, as described before.

In Step 415, when the zoom position and the preset position are not equal, using the preset mode switching section 21, determine which mode is selected between the maximum speed mode and the preset speed mode (Step 422). The preset speed mode refers to the mode in which the drive speed is set to the preset speed stored in the storage section 6a during preset driving, and the maximum speed mode refers to the mode in which the driving speed is set to the maximum speed attainable for the lens during preset driving.

Here, when the preset speed mode is selected, determine whether the speed obtained in Step 413 and the preset speed stored in the storage section 6a in advance are equal or not (for example, whether the zoom speed is within a predetermined and allowed range with respect to the preset speed or not) (Step 423).

When the zoom speed and the preset speed are not equal, determine whether the preset speed is faster than the zoom speed or not (Step 424). When the preset speed is faster than the zoom speed, increase the instruction signal output to the D/A converter 8 (Step 426). Also, when the preset speed is slower than the zoom speed, reduce the instruction signal output to the D/A converter 8 (Step 425). Furthermore, when the preset speed mode is not selected, and when the zoom speed and the preset speed are equal, leave as they are and proceed to the next Step 427.

After the above-mentioned various processes are completed, determine whether the position preset zoom switch 20 is switched from OFF to ON or not (Step 427). When the position preset zoom switch 20 is not switched from OFF to ON, return to the step to determine whether the auto focus switch 28 is ON or not (Step 401).

On the other hand, when the position preset zoom switch 20 is switched from OFF to ON, determine whether the preset drive is in operation or not (Step 428). When the preset drive is not in operation, switch the instruction signal switching section 10 to the B side (Step 429), and turn on the preset drive display section 19 (Step 430). And, determine whether the zoom direction of the preset drive is in the WIDE direction or not (Step 431).

When the zoom direction of the preset drive is in the WIDE direction, perform the AF processing (Step 432). And, when focusing is achieved at the in-focus after AF driving, finish the zoom drive (Step 433). An explanation on the drive of AF portion is omitted, as described before. When the AF drive is finished and also when the zoom direction of the preset drive is not in the WIDE direction, proceed to Step 434. In Step 434, by using the preset mode switching section 21, determine whether the preset speed mode is selected or not. When the preset speed mode is not selected (maximum speed mode), start the preset drive with the maximum speed which can be driven. Also, when the preset speed mode is selected, start the preset drive with the preset speed (Step 436).

After the above steps, when the zoom lens optical system 7 reaches to the preset position (Step 415), switch the instruction signal switching section 10 to the A side (step 416), turn off the preset drive display section 19 (Step 417), and finish the preset drive (Step 418). When the zoom direction is in the TELE direction (Step 419), perform the AF processing (Step 420). And, when focusing is achieved at the in-focus after AF driving, finish the AF drive (Step 421). An explanation on the drive of AF portion is omitted, as described before.

On the other hand, when the preset drive is in operation in Step 428, switch the instruction signal switching section 10 to the A side (Step 437), turn off the preset drive display section 19 (Step 438), and finish the preset drive (Step 439). Next, determine whether the zoom direction of the preset drive is in the TELE direction (Step 440). When the zoom direction is in the TELE direction, perform the AF processing (Step 441). And, when focusing is achieved at the in-focus after zoom driving, finish the AF drive (Step 442). An explanation on the drive of AF portion is omitted, as described before. And, return to the step to determine whether the auto focus switch 28 is ON or not (Step 401)

Hitherto, as explained above, according to the present embodiment, whether AF should be used or nor is determine depending on the zoom direction at the time of presetting. AF is able to offer precise preset image-taking of two arbitrarily different points just by performing focusing adjustment (focusing) without focusing adjustment by the user. Therefore, during the time of image-taking by using television cameras or video cameras, it is possible to broaden a range of image-taking methods, and to realize more significant preset functions further.

Furthermore, in Embodiment 1 mentioned above, the AF processing and AF drive are switched depending on the zoom direction of zoom preset drive, but, before the start of preset drive, they may be performed indiscriminately after reaching to a position stored in a position preset position memory. In addition, only preset processing may be performed immediately after preset driving, and, after reaching to the position stored in the position preset position memory, the AF drive may be performed. Or it may be performed in the midst of an active drive to the position stored in the position preset position memory. In addition, the AF processing is performed in the midst of an active drive to the position stored in the position preset position memory, and the AF drive may be performed after the completion of the preset drive.

Embodiment 2

According to Embodiment 2 of the present invention, by using a combined structure of the above-described preset drive and auto focus (AF) of the present invention, the auto focus is performed during "speed preset zoom control".

FIG. 1 shows a block diagram of a lens apparatus (optical apparatus) according to the present embodiment. An explanation on each structural element is omitted, as explained in Embodiment 1.

Drive control of a zoom lens optical system 7 by a zoom control switch 1 also will not be explained, as explained in Embodiment 1.

Next, the drive to perform the auto focus during "speed preset zoom control" (hereinafter, referred to simply as preset drive) according to the present embodiment will be explained.

This control during the preset drive is performed as follows. That is, an instruction signal outputted from CPU 6 is inputted into a motor 12 via a D/A converter 8, an instruction signal calculation section 9, a B side of a instruction signal switching section 10, and an electric power amplifier 11, and then the zoom lens optical system 7 is driven with a maximum speed or a preset speed set in advance. After this, by performing the AF processing by a synchronized signal detection section 30 and by inputting a control signal into a motor 33 via an auto focus processing section 31 and an auto focus control section 32, a focus lens optical system 34 is driven and when focusing is achieved at the in-focus is completed.

When the preset drive is performed, there are two cases in which a zoom unit is moved toward the TELE direction (telephoto end) and also toward the WIDE direction (wide angle end). When AF is performed in the TELE direction rather than in the WIDE direction, more precise focusing adjustment is possible. For this reason, depending on the zoom drive direction during zoom driving, the present embodiment will be explained separately depending on whether the AF processing and AF drive are performed before or after the preset drive.

Processing of the CPU 6 during preset driving will be explained in reference to FIG. 1 and FIGS. 4A, 4B and 5 (flow charts).

First, in order to confirm whether the user desires to use AF drive or not, determine whether an auto focus switch 28 is ON or not (Step 501). When the auto focus switch 28 is not ON, proceed to Step 511. When the auto focus switch 28 is ON, proceed to Step 502 and perform the AF processing. And, when focusing is achieved at the in-focus after AF driving, finish the AF drive (Step 503). An explanation on the drive of AF portion is omitted, as described before.

Then, go to Step 511. In Step 511, determine whether the zoom control switch 1 is in operation or not. When the zoom control switch 1 is in operation, in order to perform the control of the zoom lens optical system 7 from the zoom control switch 1, switch the instruction signal switching section 10 to the A side (Step 504).

Next, determine whether the preset drive is in operation or not (Step 505). When the preset drive is not in operation, again return to the step to determine whether the auto focus switch 28 is ON or not (Step 501).

When the preset drive is in operation in Step 505, turn off a preset drive display section 19 (Step 506), and finish (stop) the preset drive (Step 507). Therefore, in this case, it is to be said that the preset drive is suspended partway. And, successively, determine whether the zoom direction of the preset drive is in the TELE direction (Step 508). When the zoom direction is in the TELE direction, perform the AF processing (Step 509). And, when focusing is achieved at the in-focus after AF driving, finish the AF drive (Step 510). An explanation on the drive of AF portion is omitted, as described before. And, return to the step to determine whether the auto focus switch is ON or not (Step 501). When the zoom direction is in the WIDE direction, also return to the step to determine whether the auto focus switch is ON or not (Step 501).

On the other hand, when the zoom control switch is not in operation (Step 511), determine whether the preset drive is in operation or not (Step 512). When the preset drive is not in operation, proceed to Step 529.

When the preset drive is determine to be in operation in Step 512, obtain the speed and direction information of the zoom lens optical system 7 from the A/D converter 15 (Step 513), and further obtain the position information of the zoom lens optical system 7 from the A/D converter 18 (Step 514). Next, determine whether the zoom position obtained in Step 514 has reached to the edge position of the movable range of the lens apparatus or not (Step 515). When the position has reached to the end position of the movable range, switch the instruction signal switching section 10 to the A side (Step 516), turn off the preset drive display section 19 (Step 517), and finish the preset drive (Step 518).

Next, determine whether the zoom direction of the preset drive is in the TELE direction or not (Step 519). When the zoom direction is in the TELE direction, perform the AF processing (Step 520). When focusing is achieved at the in-focus after AF driving, finish the AF drive (Step 521). An explanation on the drive of AF portion is omitted, as described before. When the zoom position has not reached to the end of the movable range in Step 515, by using the preset mode switching section 21, determine whether the preset speed mode is selected or not (Step 522).

Figure 4A:
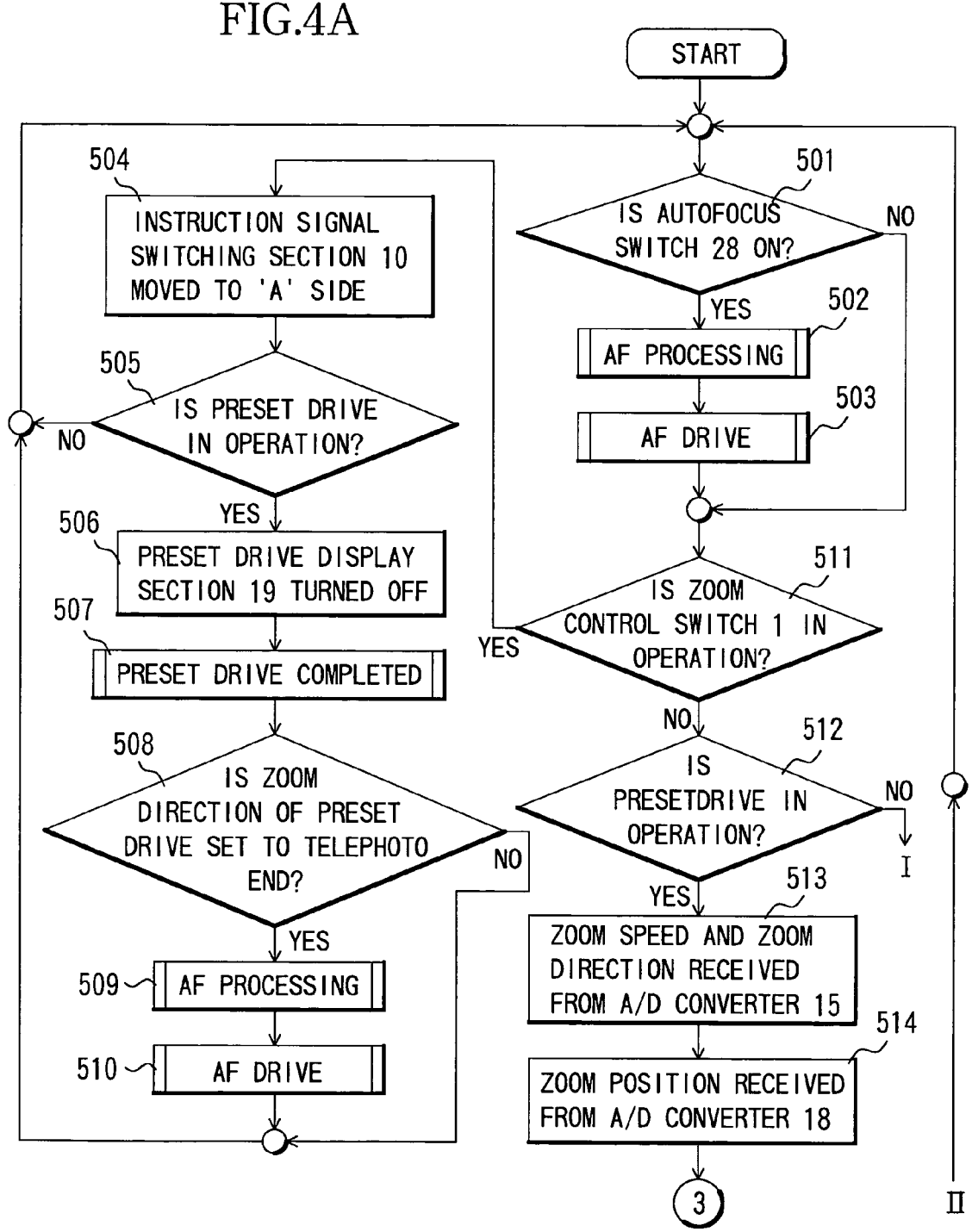
FIGS. 4A and 4B show flow chart explaining the process in CPU of a speed preset zoom system according to Embodiment 2 of the present invention.
Figure 4B:
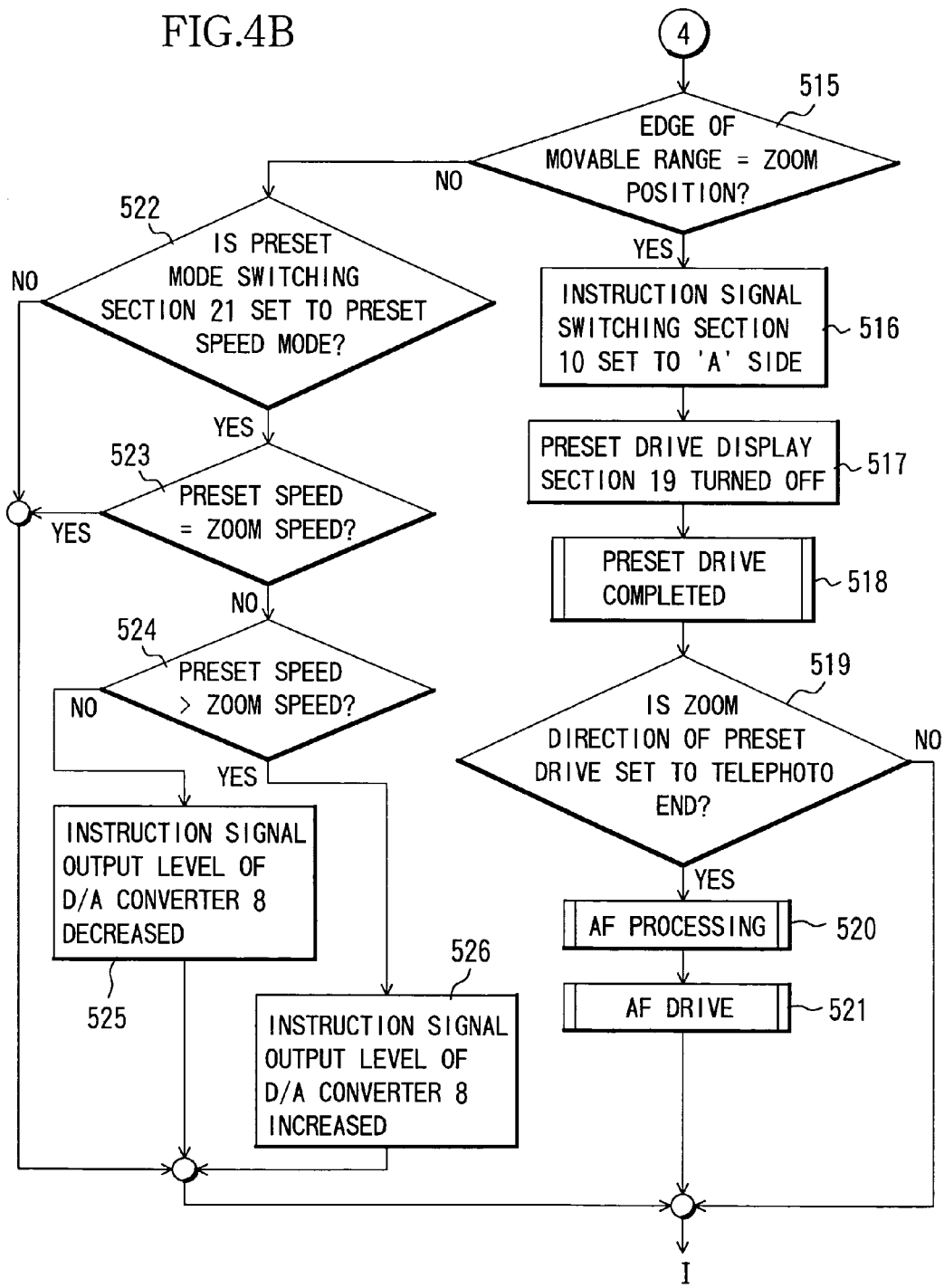
Figure 5:
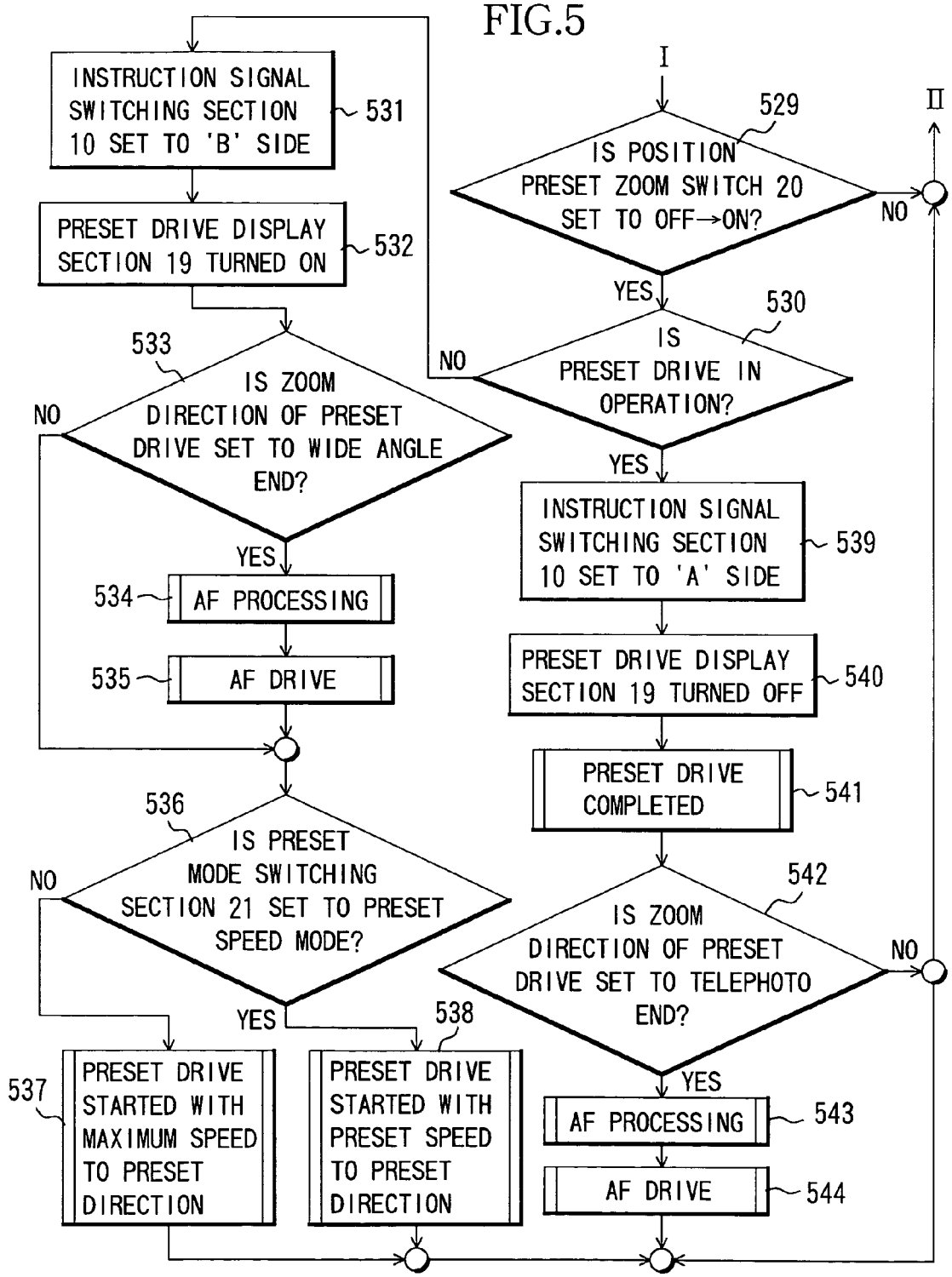
FIG. 5 shows a flow chart explaining the step following a mark I in the flow chart shown in FIG. 4 according to Embodiment 2 of the present invention and the step followed by a mark II.
Figure 6:
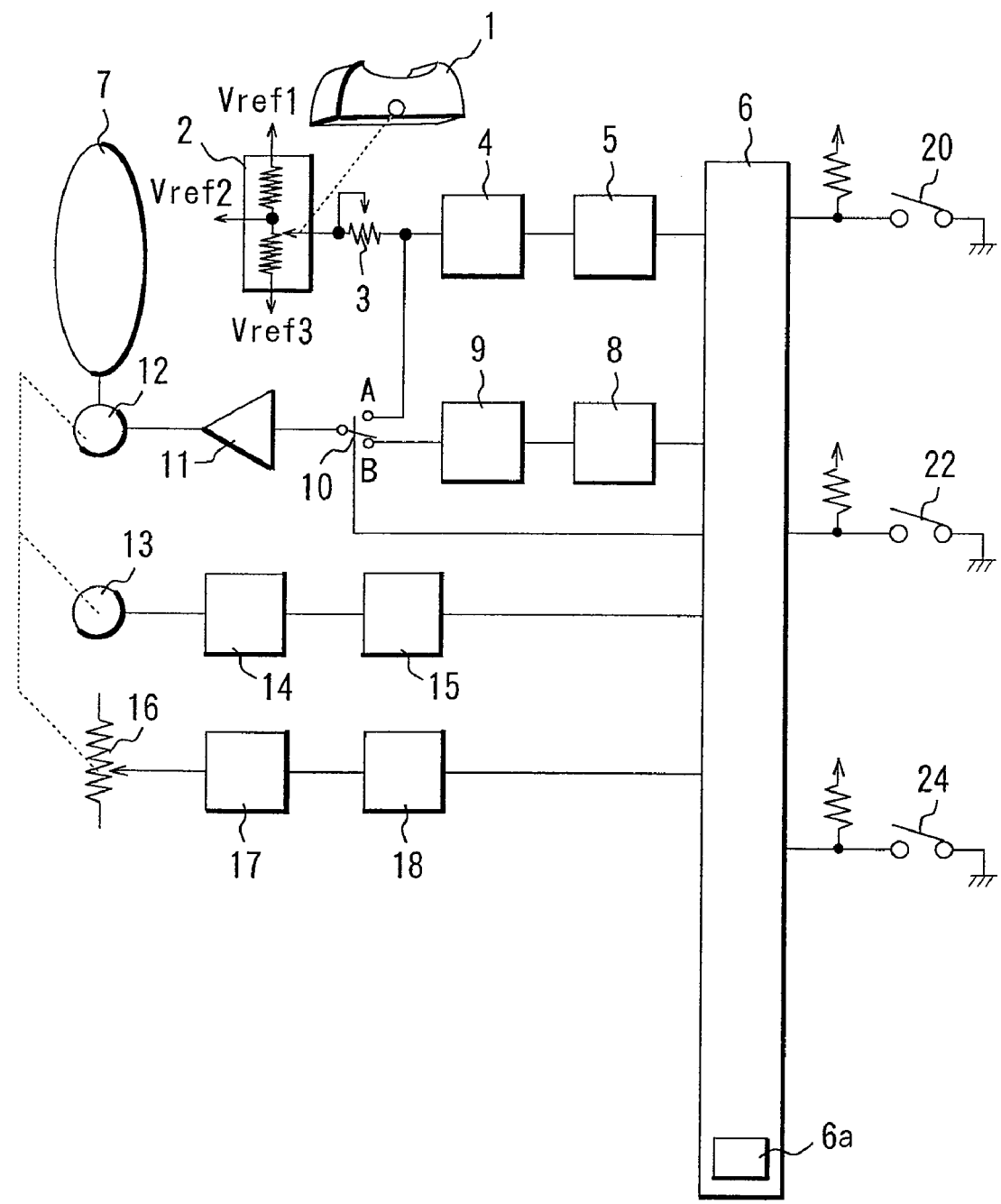
FIG. 6 shows a block diagram of a lens apparatus in the prior art.

Here, when the preset speed mode is selected, determine whether the zoom position obtained in Step 513 and the preset speed stored in the memory 6a in advance by using the flow chart shown in FIGS. 4A and 4B described above are equal or not (for example, whether the zoom speed is in a predetermined and allowable range with respect to the preset speed) (Step 523). Conversely, when the preset speed mode is not selected (maximum speed mode), go to Step 529.

In Step 523, when the zoom speed and the preset speed are not equal, determine whether the preset speed is faster than the zoom speed or not (Step 524). When the preset speed is faster than the zoom speed, increase the instruction signal output into the D/A converter 8 (Step 526). Also, when the preset speed is slower than the zoom speed, reduce the instruction signal output into the D/A converter 8 (Step 525).

Then, go to Step 529. Further, in Step 521, when the AF drive is finished, and when the zoom direction is in the WIDE direction in Step 519, then leave as they are, and go to Step 529.

After completing the various processes mentioned above, determine whether the speed preset zoom switch 22 is switched from OFF to ON or not (Step 529). When the speed preset zoom switch 22 is not switched from OFF to ON, return to the step to determine whether the auto focus switch 28 is ON or not (Step 501).

On the other hand, when the speed preset zoom switch 22 is switched from OFF to ON, determine whether the preset drive is in operation or not (Step 530). When the preset drive is not in operation, switch the instruction signal switching section 10 to the B side (Step 531), and turn on the preset drive display section 19 (Step 532). And, determine whether the zoom direction of the preset drive is in the WIDE direction or not (Step 533). When the zoom direction is in the WIDE direction, perform the AF processing (Step 534). And, when focusing is achieved at the in-focus after AF driving, finish the AF drive (Step 535). An explanation on the drive of AF portion is omitted, as described before. When the AF drive is finished, and also when the zoom direction of the preset drive is not in the WIDE direction, proceed to Step 536. In Step 536, by using the preset mode switching section 21, determine whether the preset speed mode is selected or not. When the preset speed mode is not selected (maximum speed mode), start the preset drive with the maximum drivable speed toward the preset direction (Step 537). Also, when the preset speed mode is selected, start the preset drive with the preset speed toward the preset direction (Step 538).

Thereafter, when the zoom lens optical system 7 reaches to the end of the movable range (Step 515), switch the instruction signal switching section 10 to the A side (Step 516), turn off the preset drive display section 19 (Step 517), finish the preset drive (Step 518), and when the zoom direction is in the TELE direction (Step 519), perform the AF processing (Step 520). And, when focusing is achieved at the in-focus after AF driving, finish the AF drive (Step 521). An explanation on the drive of AF portion is omitted, as described before.

On the other hand, when the preset drive is determined to be in operation in Step 530, switch the instruction signal switching section 10 to the A side (Step 539), turn off the preset drive display section 19 (Step 540), and finish the preset drive (Step 541). Next, determine whether the zoom direction of the preset drive is in the TELE direction or not (Step 542). When the zoom direction is in the TELE direction, perform the AF processing (Step 543). And, when focusing is achieved at the in-focus after AF driving, finish the AF drive (Step 544). An explanation on the drive of AF portion is omitted, as described before. And, return to the step to determine whether the auto focus switch 28 is ON or not (Step 501).

Hitherto, as explained above, according to the present embodiment, it is determine when AF should be used or not depending on the zoom direction at the time of presetting. AF is able to provide precise preset image-taking for two arbitrarily different points just by performing focusing adjustment (focusing) without focusing adjustment performed by the user. Therefore, during the time of image-taking by using television cameras or video cameras, it is possible to broaden a range of image-taking methods and to realize more significant preset functions further.

Furthermore, in Embodiment 2 mentioned above, the AF processing and AF drive are switched depending on the zoom direction of zoom preset drive, but, they may be performed indiscriminately immediately after the start of preset drive, or after reaching to the edge of the zoom movable range. In addition, only the AF processing may be performed immediately after the start of preset drive, and, the AF drive may be performed after reaching to the edge of the zoom movable range, or in the midst of the active drive toward the edge of the zoom movable range. In addition, the AF processing may be performed in the midst of the active drive to the edge of the zoom movable range and the AF drive may be performed after the completion of the preset drive.

While preferred embodiments have been described, it is to be understood that modification and variation of the present invention may be made without departing from the scope of the following claims.

This application claims priority from Japanese Patent Application No. 2003-394189 filed on Nov. 25, 2003, which is hereby incorporated by reference herein.

What is claimed is:

1. An optical apparatus comprising:
   a zoom optical system;
   a storage section which stores preset information including information on at least preset zoom position of the zoom optical system;
   a preset control section which controls the zoom optical system so as to change a zoom position of the zoom optical system to the preset zoom position by using the preset information;
   a focusing control section which performs focusing operation of the zoom optical system; and
   a controller which controls the preset control section and the focusing control section,
   wherein, when a zoom driving direction of the zoom optical system during a preset operation is to be a telephoto direction, the controller starts the focusing operation after changing the zoom position of the zoom optical system to the preset zoom position, and
   wherein, when the zoom driving direction of the zoom optical system during the preset operation is to be a wide angle direction, the controller changes the zoom position of the zoom optical system to the preset zoom position after completing the focusing operation.

2. A camera system comprising:
   the optical apparatus according to claim 1; and
   a camera which is mounted to the optical apparatus.

3. The optical apparatus according to claim 1, further comprising:
   a zoom control switch which is operated to control the zoom optical system; and
   a preset zoom switch different from the zoom control switch, which is operated to perform the preset operation.

4. The optical apparatus according to claim 1, wherein the preset operation is an operation for changing the zoom position of the zoom optical system;
   wherein, when the zoom driving direction during the preset operation is to be the telephoto direction, the controller starts the focusing operation after completing the preset operation; and
   wherein, when the zoom driving direction during the preset operation is to be the wide angle direction, the controller starts the preset operation after completing the focusing operation.

* * * * *